INVENTORS:
JOHN T. PINKSTON JR.
CHARLES GORDON MILBOURNE
BY Howson & Howson
ATTYS.

INVENTORS
JOHN T. PINKSTON JR.
CHARLES GORDON MILBOURNE
BY Howson & Howson
ATTYS.

United States Patent Office 3,429,677
Patented Feb. 25, 1969

3,429,677
MANUFACTURE OF GAS RICH IN HYDROGEN
AND IN OXIDES OF CARBON
John T. Pinkston, Jr., Swarthmore, and Charles Gordon Milbourne, Lansdowne, Pa., assignors to United Engineering & Constructors Inc., Philadelphia, Pa., a corporation of Delaware
Filed Oct. 2, 1964, Ser. No. 400,989
U.S. Cl. 48—196       4 Claims
Int. Cl. C10k 3/00; C10j 1/00

ABSTRACT OF THE DISCLOSURE

Gases rich in hydrogen and oxides of carbon, mainly carbon monoxide, are produced in twin cyclic catalytic reforming gas units, operated under a pressure of at least 50 p.s.i.g. in association with a common gas expander in which the operation of the two units is coordinated into one cycle which produces an uninterrupted, continuous and substantially uniform flow of gases under pressure into the common gas expander where the gases expand with a release of energy which is utilized to drive an air compressor supplying a continuous flow of air under pressure for use in the twin reforming units.

---

The present invention relates to a novel method for manufacturing a gas rich in hydrogen and oxides of carbon, mainly carbon monoxide; and, more particularly, the present invention relates to a novel cyclic catalytic process for reforming hydrocarbons in the presence of steam into a gas rich in hydrogen and oxides of carbon, mainly carbon monoxide, useful as combustible gas or as a source of gaseous compounds for the synthesis of other materials such as, for example, ammonia and methanol.

The reforming of hydrocarbons in the presence of steam, using a nickel or cobalt catalyst, is well known. This has been accomplished continuously by passing the hydrocarbons and steam through catalyst-containing tubes heated externally. It has been proposed to conduct this type of process under high pressure (see, for example, U.S. Patent 2,662,004) wherein a turbo-expander is utilized to handle the hot flue gases under pressure and in turn to drive an air compressor for compressing air used in the process). Other continuous processes for producing gas wherein high pressure conditions are employed are disclosed in United States Patents 2,660,521 and 2,389,636 and in the article entitled "Production of Manufactured Gas Using Gas Turbine Cycles," by Jenny, Chemical Engineering, April 1948 (pp. 108–111). One of the principal limitations of continuous tubular processes is in the heating of the catalyst which is held in the tubes. Special high temperature alloys must be used, and even then there are limitations on the amount of heat that can be supplied through the tube walls to the catalyst bed. This is aggravated when high pressure is employed since extra heavy tubes must be used. Another limitation of continuous tubular processes is that sulfur must be removed by a separate operation from process hydrocarbons which contain sulfur, otherwise the catalyst quickly becomes fouled.

Hydrocarbons, in the presence of steam, have also been reformed catalytically into hydrogen and oxides of carbon in a cyclic manner in which process, during one part of the cycle, fuel is burned and the hot products of combustion are passed through a relatively massive, stationary bed containing the catalyst to store heat therein, and, in another portion of the cycle, the hydrocarbons to be reformed and steam are passed through the catalyst bed, abstracting heat and becoming reformed into a gas rich in hydrogen and oxides of carbon. Such cyclic processes are disclosed in United States Patents 2,665,979, 2,720,450, 2,743,171, 2,759,805, 2,813,012, 2,828,196, 2,868,632, and 2,893,853. Such cyclic processes have been conducted commercially at substantially atmospheric pressure. In spite of the suggestion in United States Patent 2,544,188 that such a cyclic process may be carried out under pressure, there are many practical difficulties inherent in cyclic operation, and, until the present invention, there was no commercial reforming process for the manufacture of gas rich in hydrogen and oxides of carbon wherein high, superatmospheric pressure conditions were combined with cyclic operation.

Operation under high pressure would be advantageous for several reasons. In the first place, when the product gas is to be distributed through municipal gas mains it usually must be compressed or pressurized. In the past, this has been done after the gas has been manufactured. Thus, if the product gas is already under pressure as made, one or more stages of subsequent compression is avoided. This is also true where the product gas is to be treated to reduce or eliminate the quantity of carbon monoxide therein, where high pressure is desirable, and where the gas is to be employed in the synthesis of ammonia or methanol, in which synthesis pressure is required. Moreover, operation under high pressure provides much higher gas-making capacity for the size of the equipment involved.

It is the principal object of the present invention to provide a novel method for manufacturing gas rich in hydrogen and oxides of carbon, mainly carbon monoxide.

It is another object of the present invention to provide a method for catalytically reforming hydrocarbons in the presence of steam, utilizing cyclic principles and superatmospheric pressure conditions.

Still another object of the present invention is to provide a method for catalytically reforming hydrocarbons in the presence of steam wherein, in spite of the use of cyclic principles, the product gas is delivered under superatomspheric pressure.

These and other objects will become apparent from a consideration of the following specification and the claims.

The novel process of the present invention utilizes twin cyclic catalytic reforming gas units, operated under pressure, and in association with a common gas expander. The cycles of these two units are coordinated into one cycle where there is an uninterrupted continuous and substantially uniform flow of gases under pressure to the gas expander in which the gases under pressure are expanded to substantially atmospheric pressure. This eliminates periodic pressure changes which could not be tolerated. The energy derived from expanding the gases is utilized in turn to drive an air compressor which provides compressed air for use in the process.

The novel process, therefore, involves a cyclic process for manufacturing a gas rich in hydrogen and oxides of carbon, mainly carbon monoxide, which, in each cycle, comprises, substantially simultaneously: (1) burning a fluid fuel with compressed air in a first combustion zone, passing the resulting hot products of combustion, at an elevated pressure of at least 50 p.s.i.g., successively through a first heat storage zone of refractory material and then through a first zone of reforming catalyst to store heat in said first heat storage zone and said first catalyst zone, then at least substantially reducing said burning while continuing the flow of compressed air to purge combustion products from said first heat storage zone and from said first catalyst zone, expanding said products of combustion and purge gases, from said elevated pressure to substantially atmospheric, in an expanding zone, compressing air in a compressing zone with energy derived from such expansion in said expanding zone and passing said compressed air to said first combustion zone for burning said fluid fuel and for said purging, and (2) passing steam, at an elevated pressure of at least 50 p.s.i.g., successively through a second heat storage zone of refractory material and then through a second zone of reforming catalysts to purge said second heat storage zone and said second zone of reforming catalyst, then while continuing the flow of steam injecting hydrocarbons to be reformed, at said elevated pressure of at least 50 p.s.i.g., into said steam substantially between said second heat storage zone and said second zone of reforming catalyst, said second heat storage zone and said second zone of reforming catalyst containing heat stored therein according to step (3) below, said hydrocarbons being reformed with the said steam in said second zone of reforming catalyst into a gas rich in hydrogen and oxides of carbon, mainly carbon monoxide, and recovering said gas; and thereafter reversing said sequence by substantially simultaneously: (3) burning a fluid fuel with compressed air in a second combustion zone, passing the resulting hot products of combustion, at an elevated pressure of at least 50 p.s.i.g., successively through said second heat storage zone of refractory material and then through said second zone of reforming catalyst to store heat in said second heat storage zone in said second catalyst zone, at least substantially reducing said burning in said second combustion zone while continuing the flow of compressed air to purge combustion products from said second heat storage zone and from said second catalyst zone, expanding said products of combustion and purge gases in said expanding zone from said elevated pressure to substantially atmospheric pressure, compressing air in said compressing zone with energy derived from such expansion in said expanding zone, and passing said compressed air to said second combustion zone for burning said fluid fuel and for said purging, and (4) passing steam at an elevated pressure of at least 50 p.s.i.g., succesively through said first heat storage zone of refractory material then through said first zone of reforming catalyst to purge said first heat storage zone and said first zone of reforming catalyst, then while continuing the flow of steam injecting hydrocarbons to be reformed, at said elevated pressure of at least 50 p.s.i.g., into said steam substantially between said first heat storage zone and said first zone of reforming catalyst, said first heat storage zone and said first zone of reforming catalyst containing heat stored therein according to step (1) above, said hydrocarbons being reformed with the said steam in said first zone of reforming catalyst into a gas rich in hydrogen and oxides of carbon, mainly carbon monoxide, and recovering said gas; each of the combustion air-purging steps making up one-half of the cycle time and the flow of gases to be expanded to said expanding zone being continuous and substantially uniform in mass throughout the cycle.

The process will be more readily understood from a consideration of the drawings in which.

Figure 1:
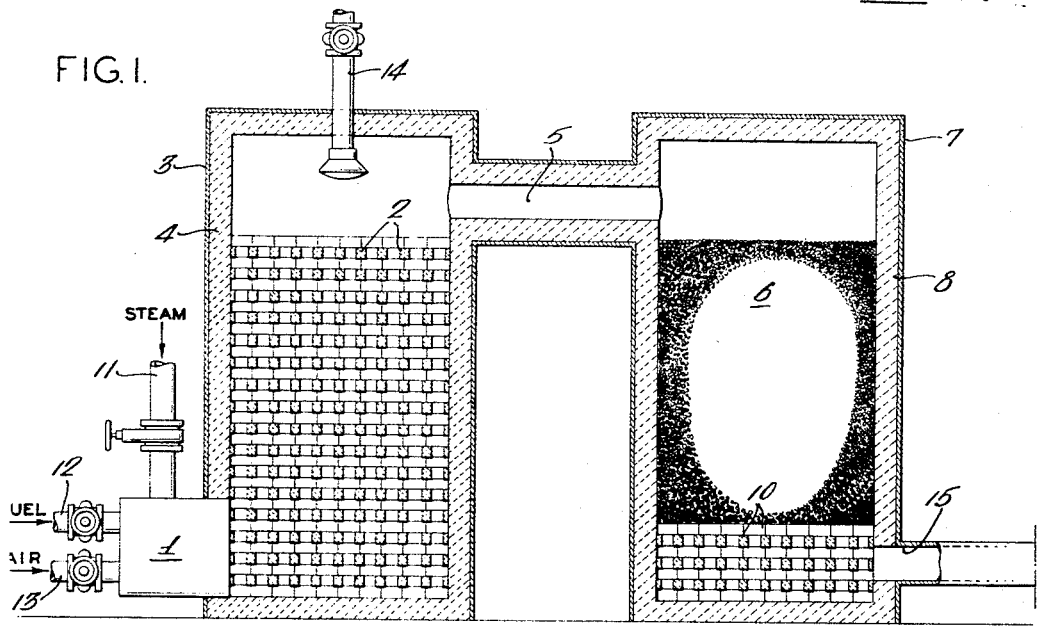
FIGURE 1 is a side, elevational view, partly in section, of a portion of typical apparatus making up each of the two substantially identical gas-making units.

Referring to FIGURE 1, the combustion zone, which may be a refractory lined box or tunnel, is represented by numeral 1. Numeral 2 represents the heat storage zone of non-catalytic refractory material, and 6 represents the reforming catalyst zone. Heat storage zone 2, is contained in a steel shell 3 lined with insulating refractory material 4. Heat storage zone 2 is composed of checkerwork, and, while this may be constructed of conventional checkerbrick, preferred checkerbrick for use is that forming the subject matter of United States Patent 3,037,758. Catalyst zone 6 is also contained in a steel shell 7 lined with insulating refractory material 8. Catalyst zone 6 is a relatively massive, stationary bed of catalyst-containing bodies, described more in detail hereinafter, and may be supported as on checkerwork structure 10. The top of catalyst zone 6 is connected with the exit end of heat storage zone 2 by means of insulated gasway 5. Connected to combustion zone 1 are valved conduits 11, 12 and 13 for introducing steam, fuel and air, respectively. Although not shown in the drawing, a portion of the steam may by-pass combustion zone 1 and be fed directly into the entrance portion (bottom as shown in the drawing) of heat storage zone 2. Process hydrocarbons for reformation are admitted substantially between the exit portion of the refractory zone 2 and the entrance portion of catalyst zone 6, as by valved conduit 14. As shown in the drawing it is desirable that the process hydrocarbons to be reformed be injected substantially countercurrent to the steam stream, to insure thorough mixing of the process hydrocarbons and steam. Gases leaving catalyst zone 6 pass through conduit 15 for further handling in accordance with the present invention.

Figure 2:
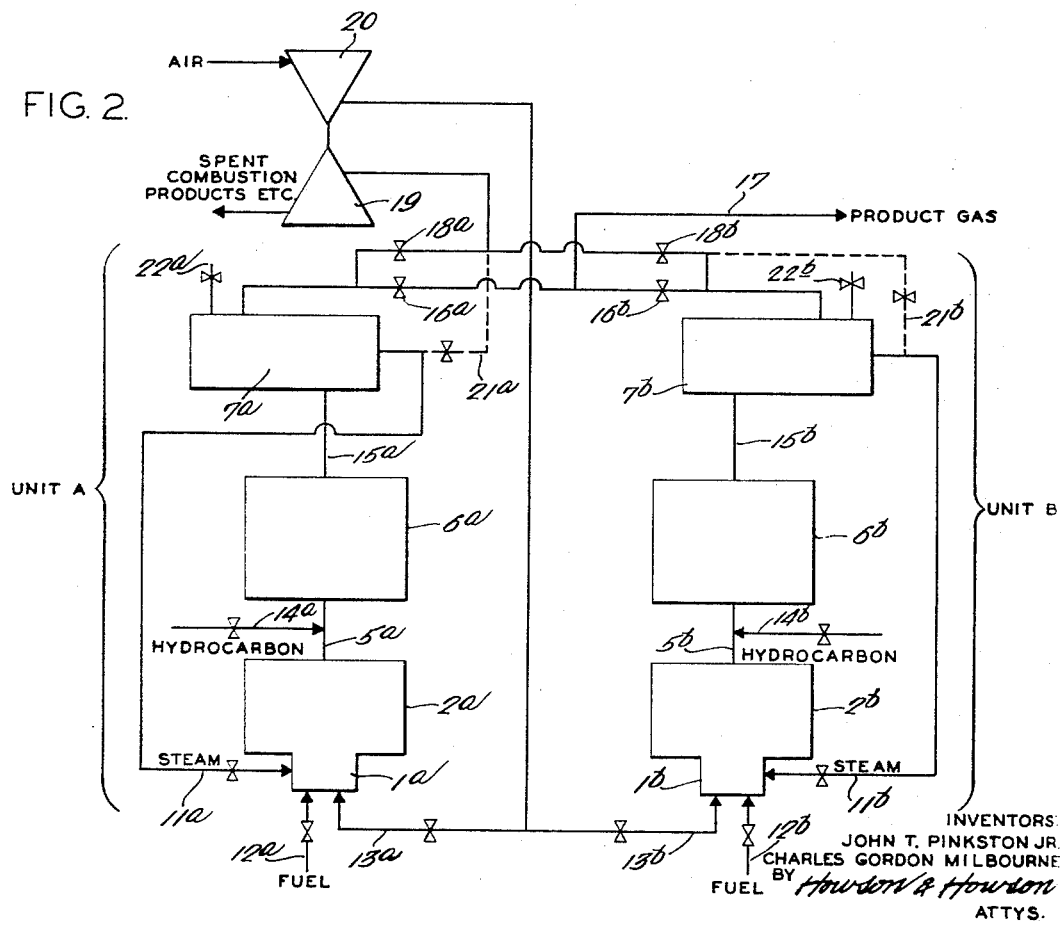
FIGURE 2 is a diagrammatical plan view of the overall apparatus made up of the two units and showing schematically the relationship of the various elements to each other.

In FIGURE 2 is a diagram showing substantially the plan of the two units, labeled unit A and unit B, respectively, in association with common expander 19. Unit A comprises combustion zone 1a, heat storage zone 2a, gas passageway 5a, catalyst zone 6a and conduit 15a together with valved conduits 11a, 12a, 13a, and 14a, respectively, for admitting steam, fuel, air and process hydrocarbons, respectively. These elements may be as described in connection with FIGURE 1. Likewise, unit B comprises combustion zone 1b, heat storage zone 2b, gas passageway 5b, catalyst zone 6b, and conduit 15b, together with valved conduits 11b, 12b, 13b, and 14b, respectively for the introduction of steam, fuel, air and process hydrocarbons respectively. Likewise these elements may be as described in FIGURE 1. In addition, as also shown in FIGURE 2, unit A may be provided with a waste heat boiler 7a and unit B may be provided with a waste heat boiler 7b. These may serve as a source for steam used during the process.

As shown in FIGURE 2, there is a common gas expander 19. Combustion products and purge gases (air and/or steam) coming from unit A, when that unit is undergoing its heating half of the cycle, may be diverted into gas expander 19 by closing valves 16a and 18b and opening valve 18a. Likewise, combustion products and purge gases (air and/or steam) coming from unit B when that unit is undergoing its heating half of the cycle may be passed into gas expander 19 by closing valves 16b and 18a and opening valve 18b. On the other hand, product gases and purge gases (air and/or steam) coming from unit A when that unit is undergoing its reforming half of the cycle, may be passed to conduit 17 by closing valves 18a and 16b and opening valve 16a. Likewise, product gases and purge gases (air and/or steam) coming from unit B, when that unit is undergoing its reforming half of the cycle, may be passed to conduit 17 by closing valves 18b and 16a and opening valve 16b.

In passing through gas expander 19, the gases which arrive under a superatmospheric pressure of at least 50 p.s.i.g., expand to substantially atmospheric pressure, releasing energy which in utrn is utilized to perform work. This energy is utilized to drive air compressor 20. In air compressor 20 air is compressed for utilization during the process, principally to support combustion during the heating portions of the cycle, and also to serve as a purging medium.

One of the essential features of the present invention is the uninterrupted, continuous and substantially uniform mass flow of gases under pressure to gas expander 19, so that, although cyclic operation is utilized respectively in units A and B, gas expander 19 operates in a continuous and substantially uniform manner.

Figure 3:
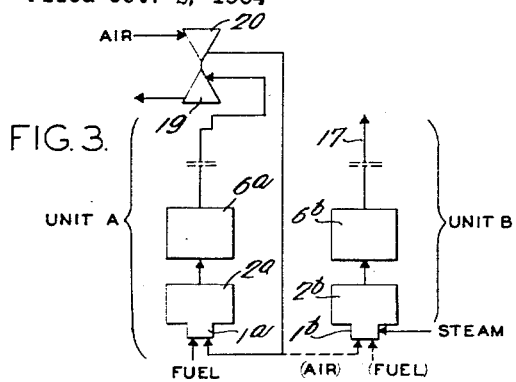
FIGURES 3–3C and 4–4C are flow diagrams illustrating schematically the principal sequence of steps conducted during the entire cycle.
Figure 3A:
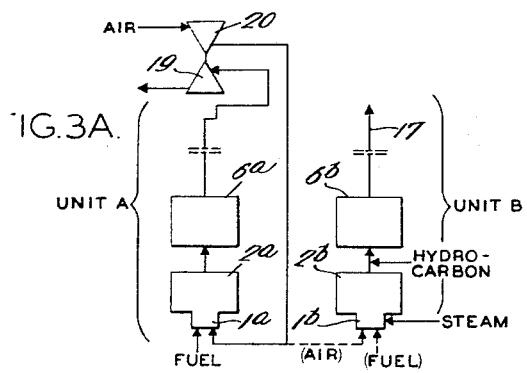
Figure 3B:
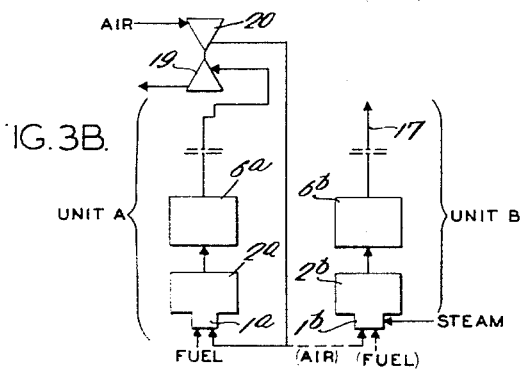
Figure 3C:
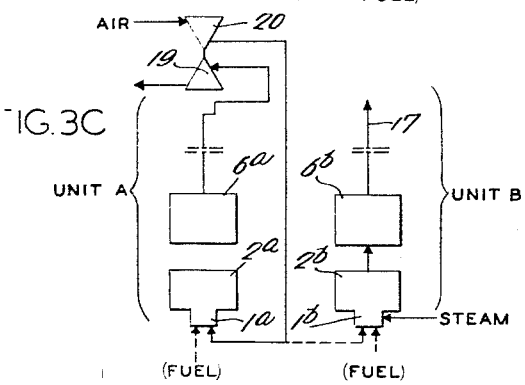
Figure 4:
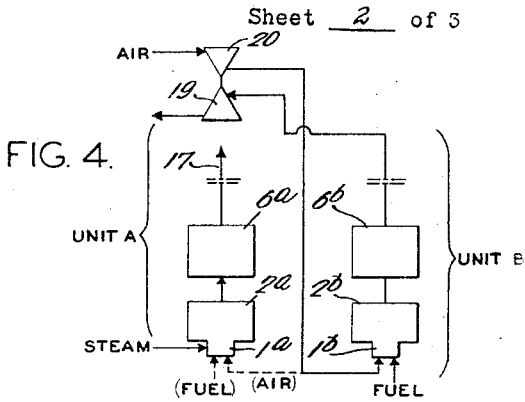
Figure 4A:
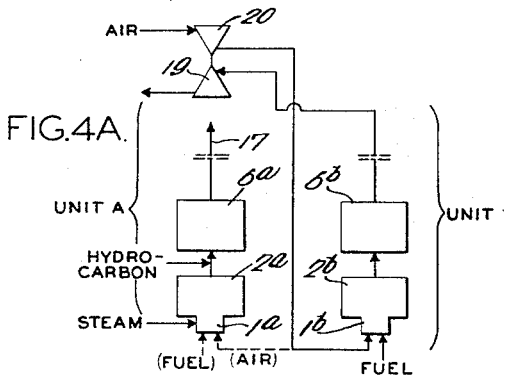
Figure 4B:
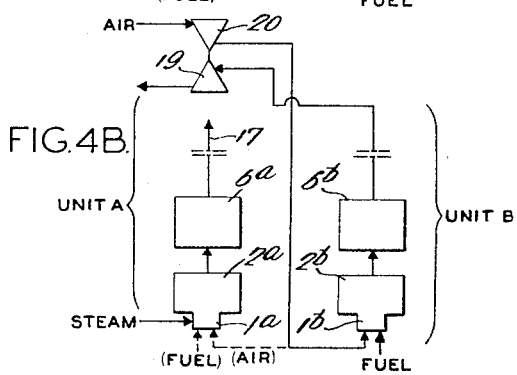
Figure 4C:
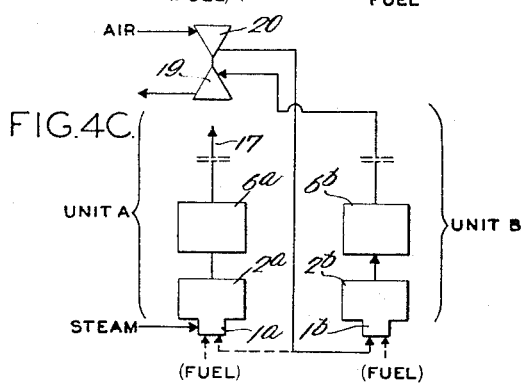

FIGURES 3–3C and 4–4C illustrate the sequence of the principal steps during one cycle according to the present invention. FIGURES 3–3C illustrate one-half of the cycle during which unit A is undergoing its heating portion (period) of the cycle and unit B is undergoing its reforming portion (period) of the cycle. FIGURES 4–4C illustrate the other half of the cycle during which unit A is undergoing its reforming portion of the cycle and unit B is undergoing its heating portion of the cycle.

In FIGURE 3 compressed air from compressor 20 and fuel are admitted to combustion zone 1a and are burnt therein. The fuel becomes ignited in combustion zone 1a by residual heat stored therein or, if necessary, by conventional ignition means. The resulting hot products of combustion are then passed through refractory, heat storage zone 2a and through catalyst zone 6a. This combustion and the resulting hot products of combustion store heat in combustion zone 1a, heat storage zone 2a and catalyst zone 6a, as well as in the refractory linings of the shells containing them. A great amount of heat may be stored in this manner and the refractory materials including the catalyst serve as a heat "sink." The hot products of combustion, under high pressure, are then pressed to gas expander 19 (by way of waste heat boiler not shown). The waste heat boiler is preferred for most efficient operation and should permit quick control, as by appropriate partial by-passing, of the temperatures of the gases going to the expander. In expanding from their high superatmospheric pressure to substantially atmospheric, the combustion gases activate expander 19, which in turn drives air compressor 20. The gases leaving expander 19 are essentially at atmospheric pressure and may be vented to the atmosphere. While the foregoing is going on in unit A, unit B will be beginning its gas-making or reforming portion of the cycle. Initially steam is admitted to combustion zone 1b and preferably also separately to the base of heat storage zone 2b, passing thence through catalyst zone 6b. This purge, serves to clear unit B of combustion products and air from its preceding heating period of the cycle, and to prevent excessive temperatures in the refractory lining of combustion zone 1b and in the inlet of heat storage zone 2b. This is followed by the sequence shown in FIGURE 3A. Combustion continues in unit A, and, in unit B, while the flow of steam is continued, the process hydrocarbons to be reformed are admitted to the steam stream substantially between heat storage zone 2b and catalyst zone 6b. The steam passing through heat storage zone 2b becomes highly heated, so that by the time the hydrocarbons are injected thereinto it contains much sensible heat which it imparts to the hydrocarbons upon becoming intimately mixed therewith. In passing through catalyst zone 6b, the mixture of hydrocarbons and steam reacts endothermically, with the absorption of heat, to form a gas consisting largely of hydrogen and oxides of carbon, mainly carbon monoxide. When the reforming in unit B is completed, the introduction of hydrocarbons is discontinued but the flow of steam is continued, as shown in FIGURE 3B, to purge product gas from unit B. In the meantime, as also shown in FIGURE 3B, combustion continues in unit A. The steam purge in unit B is of brief duration, and the sequence then goes to that shown in FIGURE 3C wherein the introduction of fuel to combustion zone 1a of unit A is either discontinued entirely or diminished greatly while the flow of air is continued to purge combustion products from the unit. At this time some air may be passed to unit B, as shown in FIGURE 3C.

Throughout the entire series of steps shown in FIGURES 3–3C, combustion products under pressure and the purge gases under pressure (air and/or steam) from unit A are fed continuously in an uninterrupted manner and at a substantially constant and uniform mass rate to gas expander 19. The series of steps basically shown in FIGURES 3–3C will take up to 50% of the entire cycle.

The second half of the cycle is one in which unit A, which has just previously been heated as shown in the sequence from FIGURES 3–3C, is utilized for reforming, and unit B, which has just previously been utilized for reforming, becomes heated. The sequence of steps shown in FIGURES 4–4C is the same as shown in, and as described above in connection with, FIGURES 3–3C except that the units are reversed. Likewise, the series of steps basically shown in FIGURES 4–4C make up the remaining 50% of the cycle.

By coordinating the reforming period, including associated purges, taking place in one unit with the heating period, including associated purges, taking place in the other, as shown above, a continuous flow of combustion gases and purge gases (and/or steam) is provided to the gas turbine, and a continuous flow of compressed air is obtained from the compressor.

It will also be noted that, following the principal combustion steps in each cycle, that is following FIGURE 3B and FIGURE 4B, the flow of air is continued, preferably at an undiminished rate, into combustion zones 1a and 1b, respectively. This continued introduction of air, without combustion or with greatly reduced combustion as discussed hereinafter, reduces the temperature of the refractory surfaces in the combustion zones. The free air is then further heated in the refractory, heat storage zones and burns off carbon and sulfur which may have been deposited in the respective catalyst zones during the prior reforming portions of the cycle therein. In addition, and most importantly, the passage of air in this manner through the catalyst zones helps to control the heat distribution in the catalyst zone through oxidation of the nickel or cobalt catalyst metal, which oxidized catalyst metal subsequently becomes reduced in the cycle through corresponding oxidation (combustion) of oxidizable gas (the hydrocarbon being reformed or reformed products thereof). This combined metal-oxidation, metal-reduction and gas-oxidizing sequence is the subject matter of United States Patent 2,759,805, the disclosure of which is incorporated herein by reference.

As will be obvious to those skilled in the art, the timing of the opening and the closing of the valves controlling the flow of gases either to the gas expander 19 or to gas recovery equipment through conduit 17 in conjunction with the corresponding opening and closing of valves upstream, will be governed by the normal time lags occurring in flowing from the upstream end of each unit to the downstream end thereof. Thus, there may be a time interval between the commencement of the admission of fuel for combustion and the diversion of the exit gas, downstream, from the product gas recovery system to the turbine. Hence it will be realized that a step beginning in one unit need not commence precisely at the same time as another step commences in the other unit, as may appear to be depicted in FIGURES 3–3C and 4–4C. The essential requirements are that the heat stored in each unit per cycle be equivalent to the heat withdrawn from that unit each cycle; that the temperatures be controlled to insure the most efficient reaction conditions consistent with the particular hydrocarbon reactant employed and the particular gas product being produced, and that the flow of gas through the gas expander be uninterrupted and continuous and at a substantially uniform mass rate, not only during the entire cycle but from cycle to cycle. This latter requirement can readily be achieved through controlled admission of steam to the system during periods when the flow of combustion products is diminished. In this connection, although not shown in FIGURES 3–3C and 4–4C, auxiliary steam for this purpose may be provided to the gas expander directly from waste heat boiler 7a and 7b, respectively, through valved conduits 21a and 21b, respectively, as shown in FIGURE 2.

In addition, while the drawings show the heat storage zone and the catalyst zone to be in separate shells, it will be apparent that, in each unit, these may be contained in a large single shell provided with space and means, such as a bosh, between the zones to insure intimate mixing of the hydrocarbon with the steam. Moreover, while FIGURE 1 shows gas flow upwardly through the heat storage zone and downwardly through the catalyst zone, this is not essential and gas flow could be downward through the heat storage zone and upward through the catalyst zone. Downward flow through the catalyst zone may have the advantage of minimizing agitation of the catalyst bodies. Although the gas expander is illustrated as being of the turbo type, it will be understood that other types, including reciprocating types, may be used. Similarly, although the air compressor is illustrated as being of the centrifugal or axial flow type, other types may be used.

For optimum gas-making capacity, each complete cycle will be of short duration, usually not more than about 3 minutes nor less than about 1½ minutes, with the presently preferred cycle being about 2 minutes in duration. Where maximum capacity is not the prime consideration, the cycle may last as long as 4 to 5 minutes. Generally, at least about 65% of the cycle time, preferably between about 75 and about 85% thereof, is made up of the actual combustion and reforming portions of the cycle, the balance being the purges.

Figure 5:
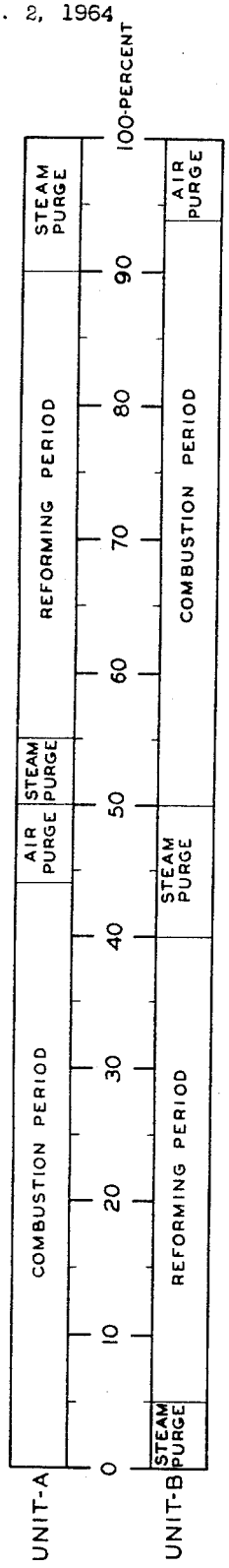
FIGURE 5 is a bar chart illustrating the timing sequence of a specific typical cycle.

In a typical cycle having a duration of 2 minutes, each combustion period (depicted in FIGURES 3–3B for unit A and in FIGURES 4–4B for unit B) makes up about 44% of the cycle time, and each air purge following combustion (depicted in FIGURE 3C for unit A and in FIGURE 4C for unit B) make up about 6% of the cycle time. In this illustration, each reforming period (depicted in FIGURE 3A for unit B and in FIGURE 4A for unit A) makes up about 35% of the cycle time and each following steam purge (depicted in FIGURES 3B and 3C for unit B and in FIGURES 4B and 4C for unit A) makes up about 10% of the cycle time. The steam purge preceding the reforming period or following the air purge (depicted in FIGURE 4 for unit A and in FIGURE 3 for unit B) makes up about 5% of the cycle. The foregoing is illustrated in FIGURE 5 where the percentage of total cycle time devoted to a particular step in the respective units is set forth graphically for a typical representative cycle.

While FIGURES 3 and 4 show the downstream gases during the respective steam purges in units B and A going through conduit 17, a portion of these may be led to expander 19 or bled to the atmosphere as through valved conduits 22a and 22b, respectively. Since these contain nitrogen, whether or not some or all of these downstream gases will be delivered to the gas recovery system through conduit 17 will depend upon whether or not the presence of nitrogen is detrimental to the product gas.

FIGURES 3–3C and 4–4C also illustrate a further embodiment wherein reduced combustion is continued in that unit wherein reforming is taking place. Thus, while in FIGURES 3—3C, unit A is being heated and unit B is being used for reforming, a limited amount of air and fuel can also be admitted to the combustion zone 1b for combustion therein with passage of the resulting combustion products through the unit along with the steam and hydrocarbon and reformed products. This type of operation, which helps to maintain temperature levels and is usable when nitrogen is not objectionable in the product gas, is the subject matter of U.S. Patent 2,813,012, the disclosure of which is incorporated herein by reference.

The present process, as stated, is conducted at superatmospheric pressure. Normally, pressures well above atmospheric (at least about 50 p.s.i.g.) will be employed. In most cases, the pressure will be at least about 75 p.s.i.g., preferably at least 90 p.s.i.g. The maximum pressures employed may depend somewhat upon the characteristics desired in the product gas. For example, for making ammonia synthesis gas or for making a gas extremely rich in hydrogen for chemical synthesis, the pressure may go up to about 900 p.s.i.g. In most cases, however, it will not be necessary to exceed about 250 p.s.i.g., and a pressure within the range of from about 150 to about 225 p.s.i.g. will be found satisfactory for most purposes. Regardless of the pressure selected, such pressure conditions should be maintained substantially constant throughout the system and throughout the cycle.

The present process is catalytic in that it relies upon nickel or cobalt, preferably the former, to catalyze the reaction between the process hydrocarbons and the steam. A suitable refractory carrier is employed, upon which the catalyst metal is disposed and throughout which it may be distributed. Difficultly reducible oxides, such as alumina, silica, magnesia, calcium oxide, titanium oxide, chromium oxide, oxides of rare earth metals such as, for example, thoria, ceria, and/or others may be present. Compounds, such as chromates and silicates, for instance zirconium silicate, may be employed. Catalytic bodies in which the catalyst metal is distributed upon refractory bodies having a porosity of between about 15% and about 60%, preferably between about 35% and about 45%, with a concentration of catalyst metal between about 2½ and about 25% are satisfactory. Preformed catalyst carrier bodies may be impregnated with a solution of a salt of the catalyst metal followed by calcining, or a paste of carrier material may be made using a solution of a salt of the catalyst metal following which the paste is formed into the desired shape and calcined. Alumina is preferred as a carrier for the catalyst metal.

One specific catalyst that might be employed is composed of alumina bodies in which the outer periphery of each body, at least to a depth of about $\frac{1}{32}$–$\frac{1}{16}$ of an inch, consists essentially of particles at least the surface of which consists of a spinel (either nickel spinel or magnesium spinel) which spinel particles additionally have a film of nickel thereon. Such a catalyst is the subject matter of co-pending application Ser. No. 350,520, filed Mar. 9, 1964 by Charles Gordon Milbourne.

The catalyst will be in the form of discrete bodies, such as spheres, cubes, cylinders, rings, lumps, and the like. Spheres are preferred. Catalyst bodies having an average diameter of from about ¼ to about 2 inches, or the equivalent, are suitable.

The process of the present invention involves, as stated, the use of a relatively massive, stationary zone of catalyst material. By "massive" is meant a relatively deep bed of catalyst material, for example, at least about 4 feet in depth and up to about 12 feet in depth. Most often, the depth of the catalyst bed will be from about 5 to about 10 feet. The diameter of the catalyst zone may vary greatly, from about ½ foot up to about 15 feet, with most catalyst zones ranging from about 1 to about 12 feet in diameter. By "stationary" is meant that the catalyst material remains at rest and that the position of each catalytic body is more or less fixed with respect to the others as distinguished from fluidized processes.

The hydrocarbon material reformed in the reforming portion of the cycle may comprise normally gaseous hydrocarbon material, such as, for example, methane, ethane, propane or butane and heavier, ash-free, hydrocarbon distillates such as kerosene, gasoline and gas oil. It is preferred that the hydrocarbon distillates be substantially ash free; that is, contain less than about 100 parts of ash per million. Corresponding unsaturated hydrocarbons may be present, such as, for example, ethylene, propylene, butylene, and the like. When normally liquid hydrocarbons are employed, they may be converted to the gaseous state prior to or upon introduction to the steam stream. Natural gas, which is primarily methane, and refinery gas streams are among the hydrocarbon materials that may be employed.

With respect to the fuel employed during the heat storage portions of the cycle, it may be any fluid—that is, gaseous or liquid combustible. Gaseous hydrocarbons, such as those mentioned above, are satisfactory. Ash free liquid hydrocarbons, such as fuel oil, gas oil, gasoline, kerosene, tar and the like may be employed if desired. In the event a liquid fuel is employed, conventional spraying or other vaporizing means may be utilized to facilitate combustion.

As stated, the principal reaction involved during the reforming portion of the cycle, is the reaction between the process hydrocarbons and steam.

The amount of steam employed may depend somewhat upon the use to be made of the product gas. Thus when the carbon monoxide in the product gas is to be converted to carbon dioxide by the water gas shift reaction which requires steam, additional steam may be tolerated in the product gas and in this case the amount employed may go up to about 5 pound mols of steam per pound atom of carbon in the hydrocarbon reactant. Aside from this, the preferred amount of steam is between about 1.5 and about 2.5 pound mols thereof per pound atom of carbon in the hydrocarbon reactant. Some air may be employed during the reforming portion of the cycle, and, in such case, the proportion of steam to hydrocarbons may be decreased to as low as about .8 pound mol of steam per pound atom of carbon.

As far as air itself is concerned, when this is used during the reforming portion of the cycle it will be in an amount generally less than about 2 pound mols thereof per pound atom of carbon in the hydrocarbon reactant, and in most cases will be less than about one pound mol thereof. The preferred amount of air, when used, will be between about 0.1 and about 0.6 pound mol thereof per pound atom of carbon in the hydrocarbon reactant.

The temperatures provided in the system are, of course, subject to swing, as between the end and beginning of the heating period in each unit, and to gradient, as between different locations in each unit at the same time. Likewise, as is known to those skilled in the art, the exact temperatures employed may be determined in part by the type of product gas desired and the process hydrocarbons employed. In general, the temperature of the steam leaving each heat storage zone during the reforming portions of the cycle will be in the range of from about 1600 to about 2200° F. so that the resulting mixture of hydrocarbons and steam entering the catalyst zone will have a temperature in the range of from about 1300 and about 1700° F. The temperature in the catalyst zone itself, will normally not go below about 1300° F. The upper limit of the temperature in the catalyst zone may also depend, in part, on the nature of the catalyst, and some catalysts may stand temperatures as high as about 2000° F. With other, more conventional, catalysts the upper limit is usually about 1700° F. In general, the preferred average temperatures in the catalyst zone during the cycle will be between about 1450 and about 1600° F. As stated, these are average temperatures, and it will be understood that cyclic swings in temperature may result in a temperature somewhat exceeding this range momentarily and a temperature somewhat below this range momentarily, such as the temperature of the exit portion of each catalyst zone at the completion of the reforming portions of the cycle. The product gas leaving the catalyst zone during the reforming portion of the cycle will normally be at a temperature between about 1250° F. and about 1650° F., although it may be somewhat higher when a high temperature-resistant catalyst is used and higher temperatures are used in the catalyst zone.

The product gas will be rich in hydrogen and oxides of carbon, mainly carbon monoxide. However, the gas may range from one consisting essentially of hydrogen and carbon monoxide, with minor or small amounts of carbon dioxide and a small percentage of unconverted hydrocarbons, and having a calorific value of about 275 B.t.u. per cubic foot, up to a gas containing as much as 50% of hydrocarbons containing from one to four carbon atoms, in addition to the hydrogen and carbon monoxide, which gas has a calorific value as high as about 750 B.t.u. per cubic foot. The product gas may be used as a combustible gas and distributed in municipal gas mains or it may be used as a reactant gas, with or without further treatment, for producing other compounds, such as ammonia, methanol and the like. Or it may be used as a source of hydrogen gas.

Modification is possible in the particular procedural techniques and materials employed and in the amounts thereof without departing from the scope of the invention as set forth in the following claims.

What is claimed is:

1. The cyclic process for manufacturing a gas rich in hydrogen and oxides of carbon, mainly carbon monoxide, which, in each cycle, comprises substantially simultaneously: (1) burning a fluid fuel with compressed air in a first combustion zone, passing the resulting hot products of combustion, at an elevated pressure of at least 50 p.s.i.g. successively through a first heat storage zone of refractory material and then through a first zone of reforming catalyst to store heat in said first heat storage zone and said first catalyst zone, then at least substantially reducing said burning while continuing the flow of compressed air to purge combustion products from said first heat storage zone and from said first catalyst zone, expanding said products of combustion and purge gases, from said elevated pressure to substantially atmospheric, in an expanding zone, compressing air in a compressing zone with energy derived from such expansion in said expanding zone and passing said compressed air to said first combustion zone for burning said fluid fuel and for said purging, and (2) passing steam, at an elevated pressure of at least 50 p.s.i.g., successively through a second heat storage zone of refractory material then through a second zone of reforming catalyst to purge said second heat storage zone and said second zone of reforming catalyst, then while continuing the flow of steam injecting hydrocarbons to be reformed, at said elevated pressure of at least 50 p.s.i.g., into said steam substantially between said second heat storage zone and said second zone of reforming catalyst, said second heat storage zone and said second zone of reforming catalyst containing heat stored therein according to step (3) below, said hydrocarbons being reformed with said steam in said second zone of reforming catalyst into a gas rich in hydrogen and oxides of carbon, mainly carbon monoxide, and recovering said gas; and thereafter reversing said sequence by substantially simultaneously: (3) burning a fluid fuel with compressed air in a second combustion zone, passing the resulting hot products of combustion, at an elevated pressure of at least 50 p.s.i.g., successively through said second heat storage zone of refractory material and then through said second zone of reforming catalyst to store heat in said second heat storage zone and said second catalyst zone, then at least substantially reducing said burning in said second combustion zone while continuing the flow of compressed air to purge combustion products from said second heat storage zone and from said second catalyst zone, expanding said products of combustion and purge gases in said expanding zone from said elevated pressure to substantially atmospheric pressure, compressing air in said compressing zone with energy derived from such expansion in said expanding zone, and passing said compressed air to said second combustion zone for burning said fluid fuel and for said purging, and (4) passing steam, at an elevated pressure of at least 50 p.s.i.g., successively through said first heat storage zone of refractory material and then through said first zone of reforming catalyst to purge said first heat storage zone and said first zone of reforming catalyst, then while continuing the flow of steam, injecting hydrocarbons to be reformed, at said elevated pressure of at least 50 p.s.i.g., into said steam substantially between said first heat storage zone and said first zone of reforming catalyst, said first heat storage zone and said first zone of reforming catalyst containing heat stored therein according to step (1) above, said hydrocarbons being reformed with said steam in said first zone of reforming catalyst into a gas rich in hydrogen and oxides of carbon, mainly carbon monoxide, and recovering said gas; each of said combustion-air-purging steps making up one-half of the cycle time and the flow of gases to be expanded to said expanding zone being continuous and substantially uniform in mass throughout the cycle.

2. The process of claim 1 wherein, during the latter portion of steps (2) and (4), the injection of hydrocarbons into said steam is discontinued and said steam purges product gas from said heat storage and catalyst zones.

3. The process of claim 1 wherein, during steps (2) and (4) combustion is continued, but at a substantially reduced rate.

4. The process of claim 1 wherein, during steps (2) and (4) combustion is discontinued.

References Cited

UNITED STATES PATENTS

| 2,662,004 | 12/1953 | Gaucher | 48—196 |
|---|---|---|---|
| 2,893,853 | 7/1959 | Milbourne | 23—288 XR |
| 2,944,806 | 7/1960 | Carter | 48—214 XR |
| 3,270,078 | 8/1966 | Bogart | 48—214 XR |

MORRIS O. WOLK, *Primary Examiner.*

R. E. SERWIN, *Assistant Examiner.*

U.S. Cl. X.R.

48—214, 215

UNITED STATES PATENT OFFICE
CERTIFICATE OF CORRECTION

Patent No. 3,429,677                                    February 25, 1969

John T. Pinkston, Jr., et al.

It is certified that error appears in the above identified patent and that said Letters Patent are hereby corrected as shown below:

In the heading to the printed specification, lines 5 and 6, "United Engineering & Constructors Inc.," should read -- United Engineers & Constructors Inc., --. Column 4, line 64, "utrn" should read -- turn --. Column 5, line 23, "pressed" should read -- passed --.

Signed and sealed this 31st day of March 1970.

(SEAL)
Attest:

Edward M. Fletcher, Jr.

Attesting Officer

WILLIAM E. SCHUYLER, JR.

Commissioner of Patents